US006926749B1

(12) United States Patent
Tenney

(10) Patent No.: US 6,926,749 B1
(45) Date of Patent: Aug. 9, 2005

(54) CYCLONE SEPARATOR WITH COMPACT INLET

(75) Inventor: Edwin D. Tenney, Annville, PA (US)

(73) Assignee: Fisher-Klosterman, Louisville, KY (US)

( * ) Notice: Subject to any disclaimer, the term of this patent is extended or adjusted under 35 U.S.C. 154(b) by 19 days.

(21) Appl. No.: 10/609,054

(22) Filed: Jun. 27, 2003

(51) Int. Cl.[7] ............................................. B01D 45/16
(52) U.S. Cl. ................... 55/459.1; 55/459.4; 55/459.5; 95/271; 210/512.1
(58) Field of Search ........................... 55/459.1, 459.4, 55/459.5; 210/512.1; 95/269, 271

(56) References Cited

U.S. PATENT DOCUMENTS

| 418,835 | A | * | 1/1890 | Allington .................... 55/459.1 |
| 602,964 | A | * | 4/1898 | Van Gelder .................... 55/411 |
| 678,451 | A | | 7/1901 | Allington .................... 55/391 |
| 1,717,369 | A | | 6/1929 | Clements .................... 55/330 |
| 2,295,101 | A | | 9/1942 | Dunham ..................... 55/459.5 |
| 2,523,614 | A | * | 9/1950 | Elverum ...................... 209/722 |
| 2,786,547 | A | * | 3/1957 | McCartney ................. 55/459.5 |
| 3,306,461 | A | * | 2/1967 | Weis ........................ 210/512.1 |
| 3,513,642 | A | * | 5/1970 | Cornett ......................... 55/399 |
| 3,745,752 | A | | 7/1973 | Gallaer .......................... 55/418 |
| 3,850,816 | A | | 11/1974 | Koch ....................... 210/512.1 |
| 3,883,332 | A | * | 5/1975 | Llewelyn et al. ........... 55/459.5 |
| 3,953,184 | A | | 4/1976 | Stockford et al. ............ 55/458 |
| 4,216,095 | A | * | 8/1980 | Ruff ........................ 210/512.1 |
| 4,511,379 | A | * | 4/1985 | Hauptmann ................... 96/290 |
| 4,519,822 | A | * | 5/1985 | Hatano et al. ............. 55/459.1 |
| 4,600,410 | A | * | 7/1986 | Baillie et al. .................. 95/269 |
| 4,743,363 | A | * | 5/1988 | Darrow ...................... 209/138 |
| 4,848,993 | A | | 7/1989 | Elkjaer ....................... 55/459.1 |
| 5,238,475 | A | * | 8/1993 | Keuschnigg ................. 55/349 |
| 5,518,695 | A | | 5/1996 | Goodspeed et al. ......... 422/144 |
| 6,344,064 | B1 | * | 2/2002 | Conrad ......................... 55/337 |
| 6,379,567 | B1 | * | 4/2002 | Crites .......................... 210/788 |

* cited by examiner

*Primary Examiner*—Richard L. Chiesa
(74) *Attorney, Agent, or Firm*—Camoriano and Associates; Theresa Fritz Camoriano

(57) ABSTRACT

A cyclone separator is provided with a compact inlet path, in which the inner and outer walls of the inlet path are curved, with the inner wall having a radius that is essentially the same as the radius of the cyclone body wall and with the outer wall wrapping around the cyclone body wall and merging with the cyclone body wall.

9 Claims, 11 Drawing Sheets

CYCLONE SEPARATOR WITH COMPACT INLET

BACKGROUND

The present invention relates to cyclone separators, and, in particular, to a cyclone separator with a compact inlet.

FIGS. 1, 1A, and 2 are schematic drawings showing an example of a typical prior art cyclone, in which the inlet path into the cyclone extends along a straight line that is tangent to the body of the cyclone. This is an efficient and effective design, but it can be a problem in tight spaces, such as where the cyclone separator is inside another vessel or when several cyclone separators are interconnected.

SUMMARY

In order to make the cyclone separator more compact, while still being efficient in terms of construction and function, the present invention provides an inlet path which, instead of extending in a straight line that is tangent to the circular cross-section of the body of the cyclone, wraps partially around the cyclone body.

DESCRIPTION OF THE PREFERRED EMBODIMENTS

Figure 1:
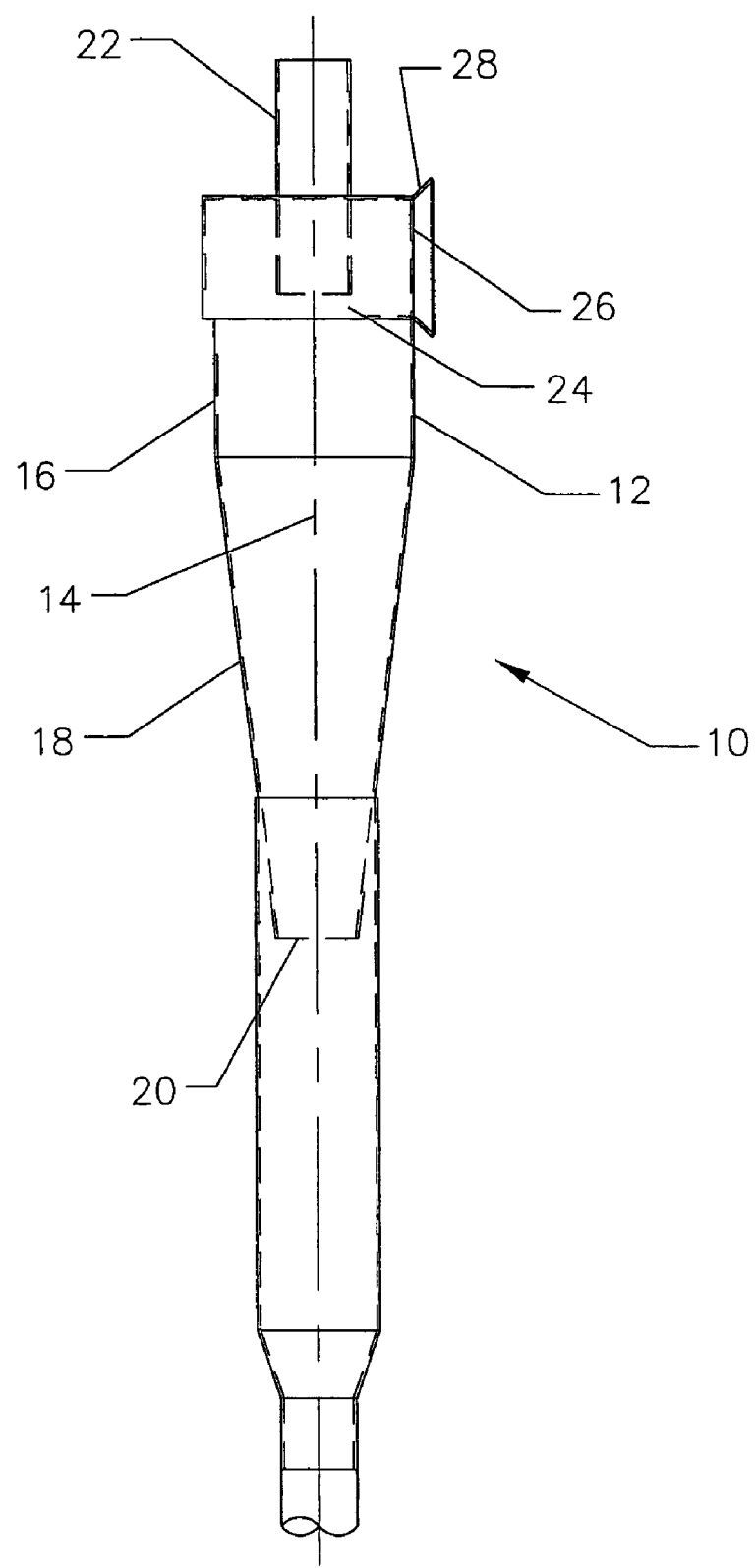
FIG. 1 is a schematic side view of a prior art cyclone using a straight line inlet path.
Figure 1A:
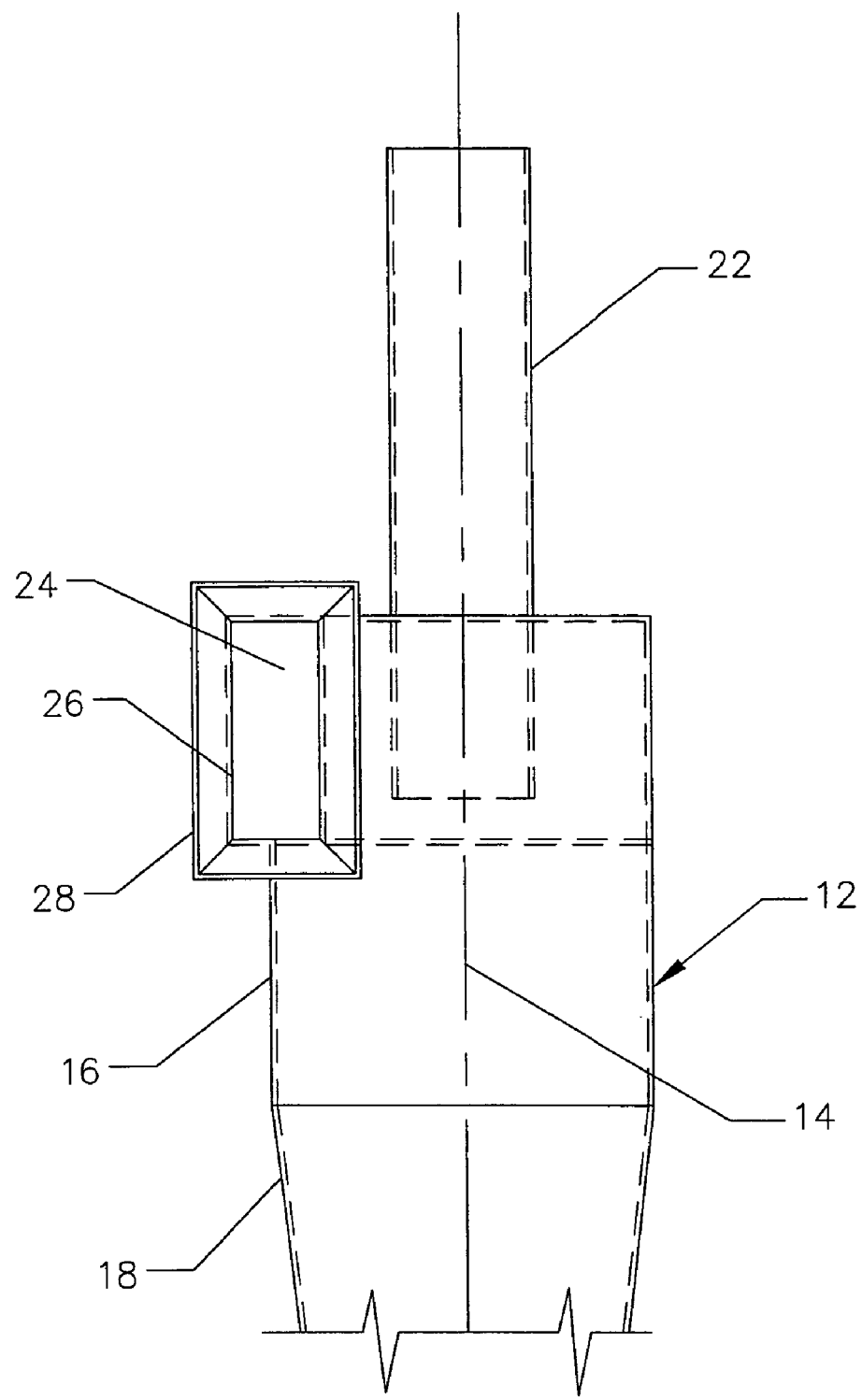
FIG. 1A is an enlarged broken away view taken from the right side of FIG. 1.
Figure 2:
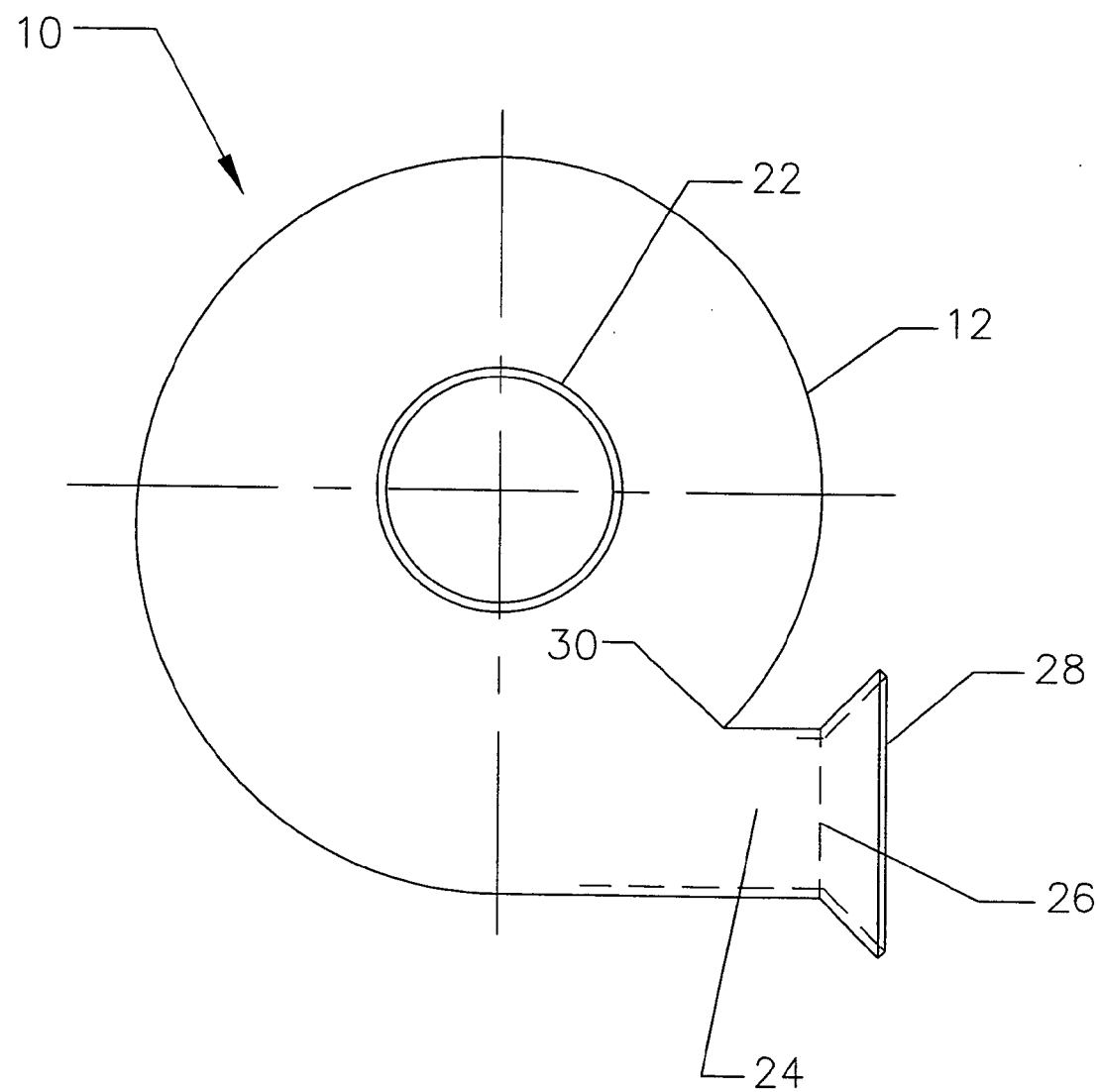
FIG. 2 is a top view of the prior art cyclone of FIG. 1.

FIGS. 1, 1A, and 2 show a prior art cyclone 10. The cyclone 10 includes a main cyclone body 12, which has a vertical axis 14. The cyclone body 12 is cylindrical in its top portion 16 and frustro-conical in its lower portion 18. It defines a bottom opening 20, and it includes a cylindrical outlet tube 22 in its top portion. It has a straight inlet path 24, which is tangent to the upper portion 16 of the cyclone body 12, and the inlet path has a constant height and width from the outer opening 26 to the inner opening 30. There is a flared lip 28 extending for a very short distance outwardly from the outer opening 26.

In this prior art cyclone 10, particulate-laden gas enters the inlet path 24 through the flared lip 28 into the inlet 26, impinging on the interior of the cyclone body 12 and following a downward spiral path along the inside of the cyclone body 12. The particulates in the gas are separated out and fall down through the bottom opening 20. The clean gas then turns upwardly through the center of the spiral and leaves through the outlet tube 22.

Figure 3:
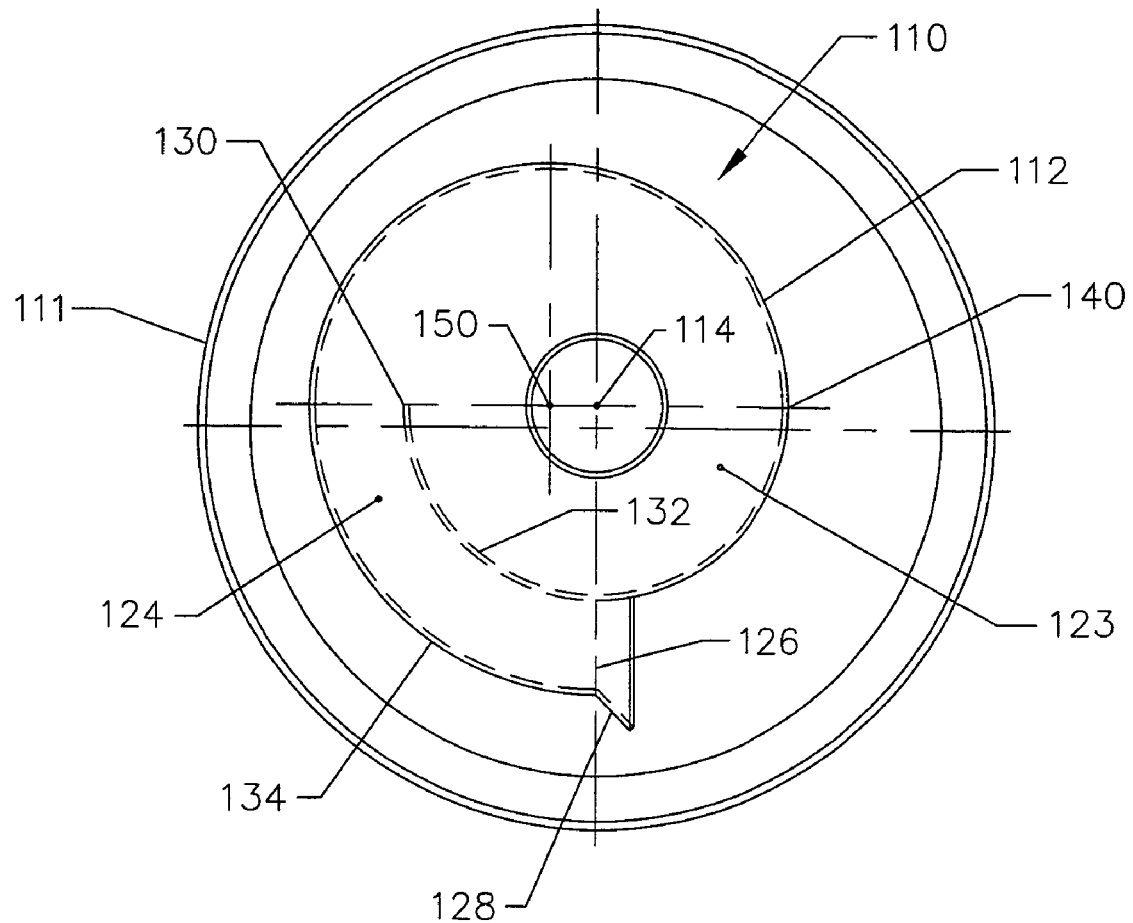
FIG. 3 is a schematic top view of a first cyclone made in accordance with the present invention.
Figure 4:
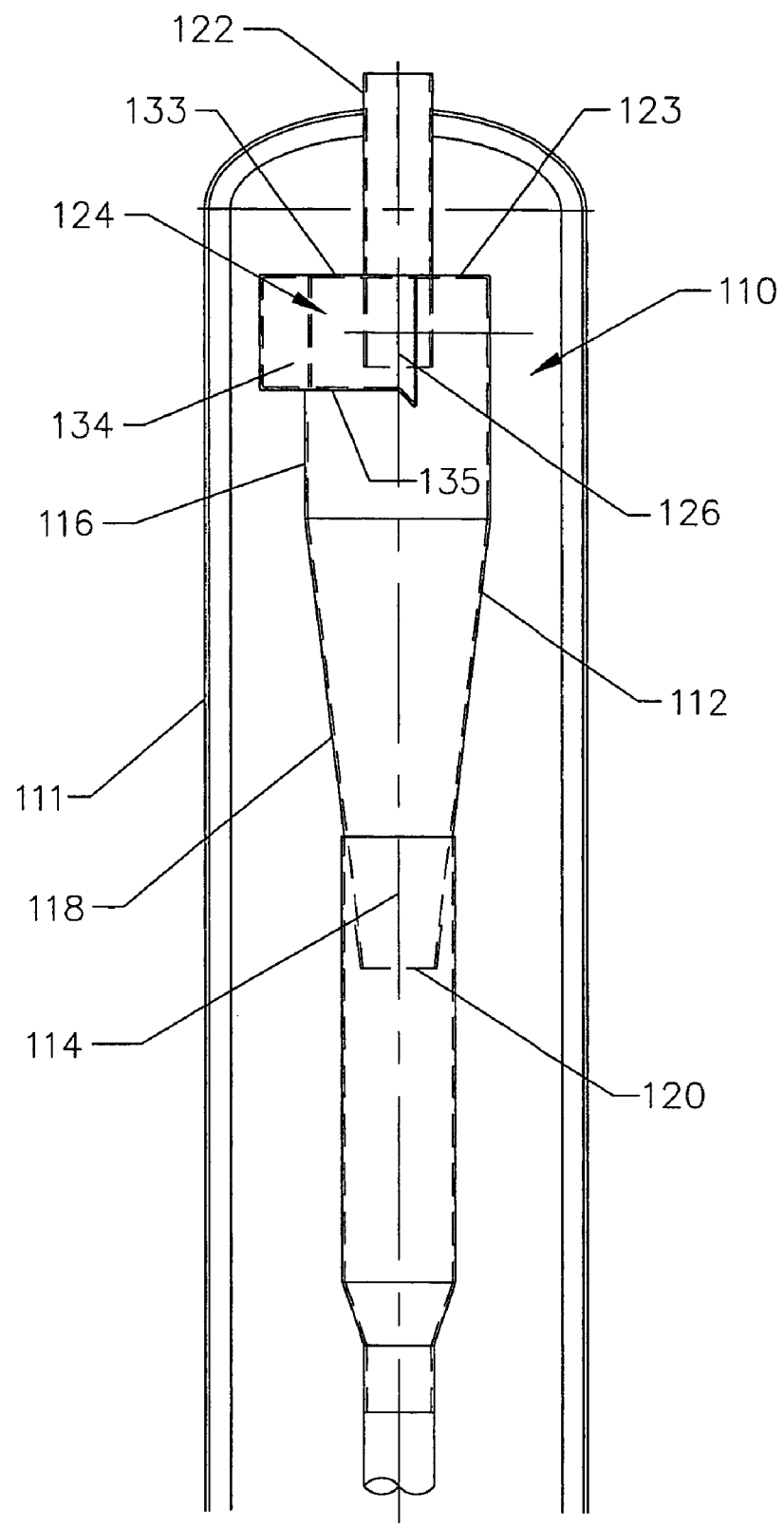
FIG. 4 is a side view of the cyclone of FIG. 3.
Figure 4A:
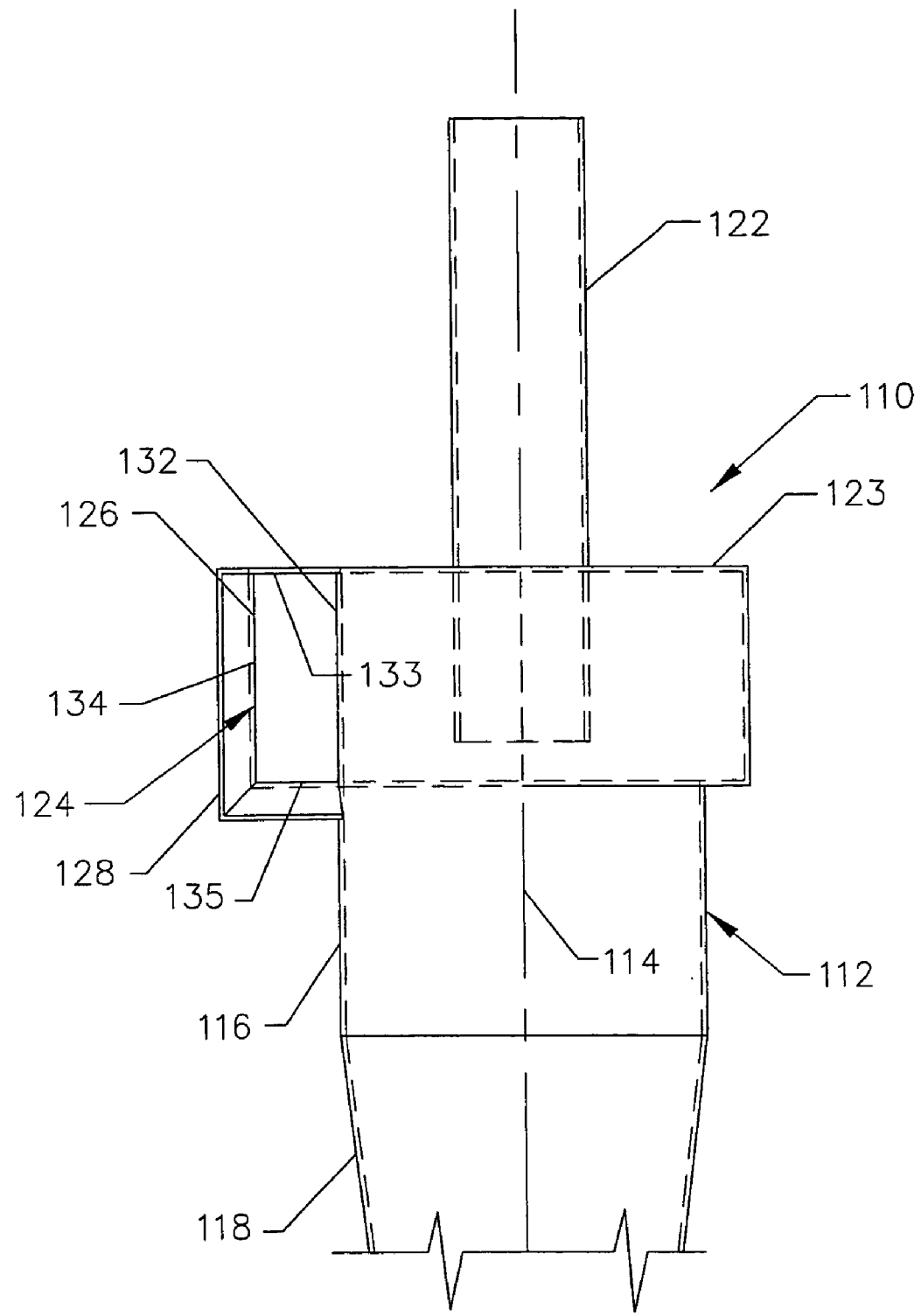
FIG. 4A is an enlarged view taken from the right side of FIG. 4, with the outer vessel removed for clarity.

FIGS. 3, 4, and 4A show a first cyclone 110 made in accordance with the present invention. This particular cyclone 110 is shown as being inside of a vessel 111, because that is an environment in which the compact inlet is very helpful. However, the cyclone 110 could also be used without the vessel 111. As with the prior art cyclone 10, this cyclone 110 has a cyclone body wall 112, which has a circular cross-section oriented about a central vertical axis 114. The upper portion 116 of the cyclone body wall 112 is cylindrical, and the lower portion 118 is frustro-conical and defines a bottom opening 120, so the radius of the cyclone body wall 112 tapers from a larger radius at the top to a smaller radius at the bottom. While it is typical for a cyclone to have a cylindrical portion and a frustro-conical portion, as has been shown here, the cyclone may be tapered along its entire height or in some other manner, with the larger radius at the top and the smaller radius at the bottom. A central outlet pipe 122, aligned with the central vertical axis 114, extends out the closed top 123, and the cleaned gas stream leaves the cyclone 110 through that outlet pipe 122.

This cyclone 110 has a curved inlet path 124, extending from an outer opening 126 to an inner opening 130. There is a flared lip 128 extending for a very short distance at the outer opening 126, with the outer and lower walls 134, 135 of the inlet path 124 being flared outwardly for a short distance to form the lip 128. In this embodiment, the inner wall 132 of the curved inlet path 124 conforms to the cyclone body wall 112 and extends about 90° from the outer opening 126 to the inner opening 130. It is preferred that the inner wall 132 of the curved inlet path 124 extend along an angular distance in the range of 60° to 120°. The inner wall 132 may conform to the cyclone body wall 112 either by actually being the cyclone body wall 112 itself, or by being a separate wall that lies alongside the cyclone body wall 112. Since this inner wall 132 conforms to the circular cross-section cyclone body wall 112, it has a constant radius that is the same as the radius of the cyclone body wall 112 at the height of the inlet path 124.

The outer wall 134 of the inlet path 124 has a larger radius than the inner wall 132 at the outer opening 126, and it wraps around the outside of the cyclone wall 112 until it becomes tangent to and merges with the cyclone wall 112 at the point 140. In this embodiment, the width of the inlet path 124 from the outer wall 134 to the inner wall 132 is relatively constant, and the height of the inlet path 124 from the upper wall 133 to the lower wall 135 is constant from the outer opening 126 to the inner opening 130. The outer wall 134 is radiused about a second vertical axis 150, which is offset from the central vertical axis 114. By essentially wrapping the inlet path 124 around the cyclone body wall 112, the cyclone 110 becomes more compact than the prior art cyclone 10 while still functioning essentially the same way and requiring only slightly more material to manufacture.

Figure 5:
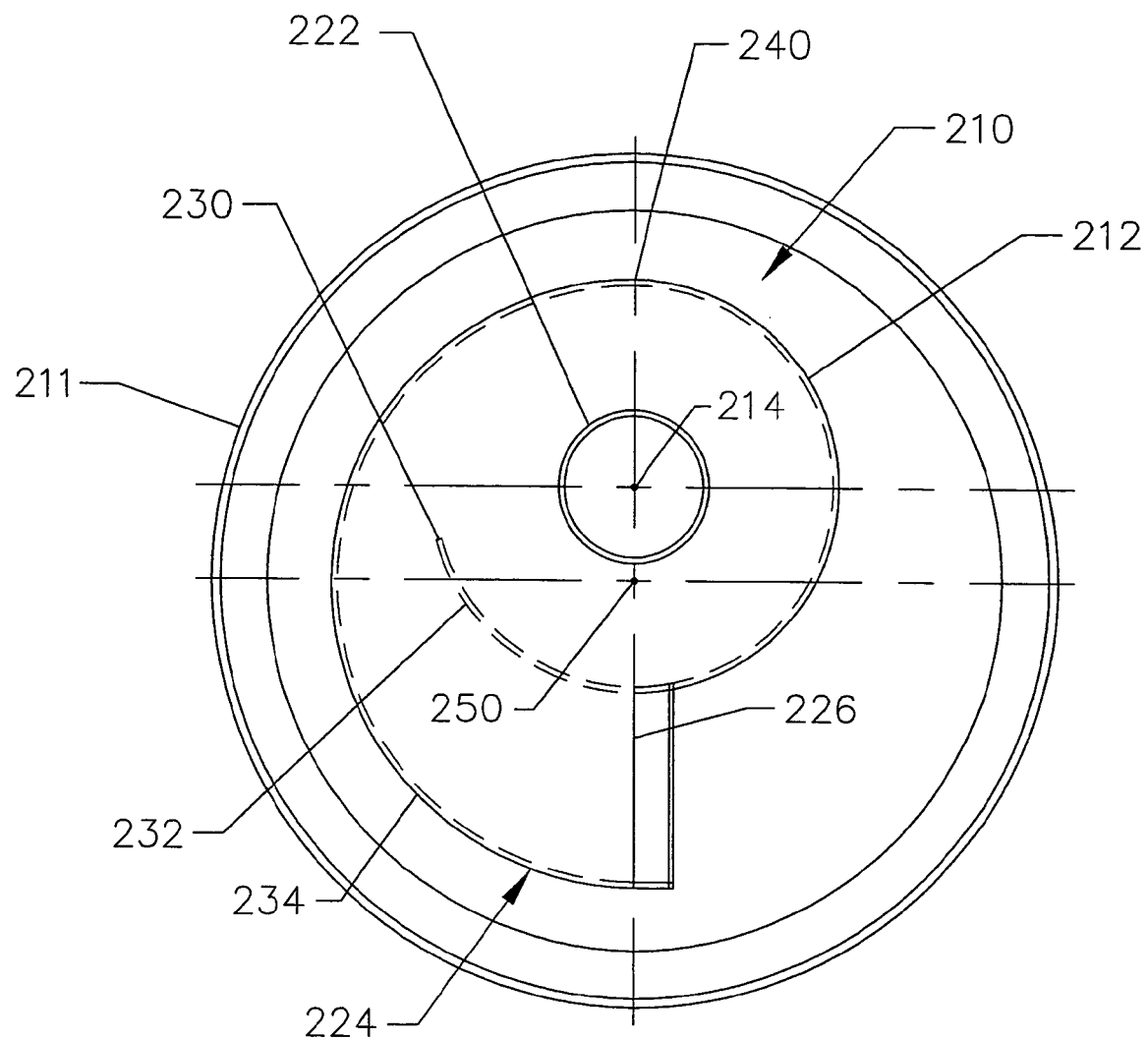
FIG. 5 is a schematic top view of a second cyclone made in accordance with the present invention.
Figure 6:
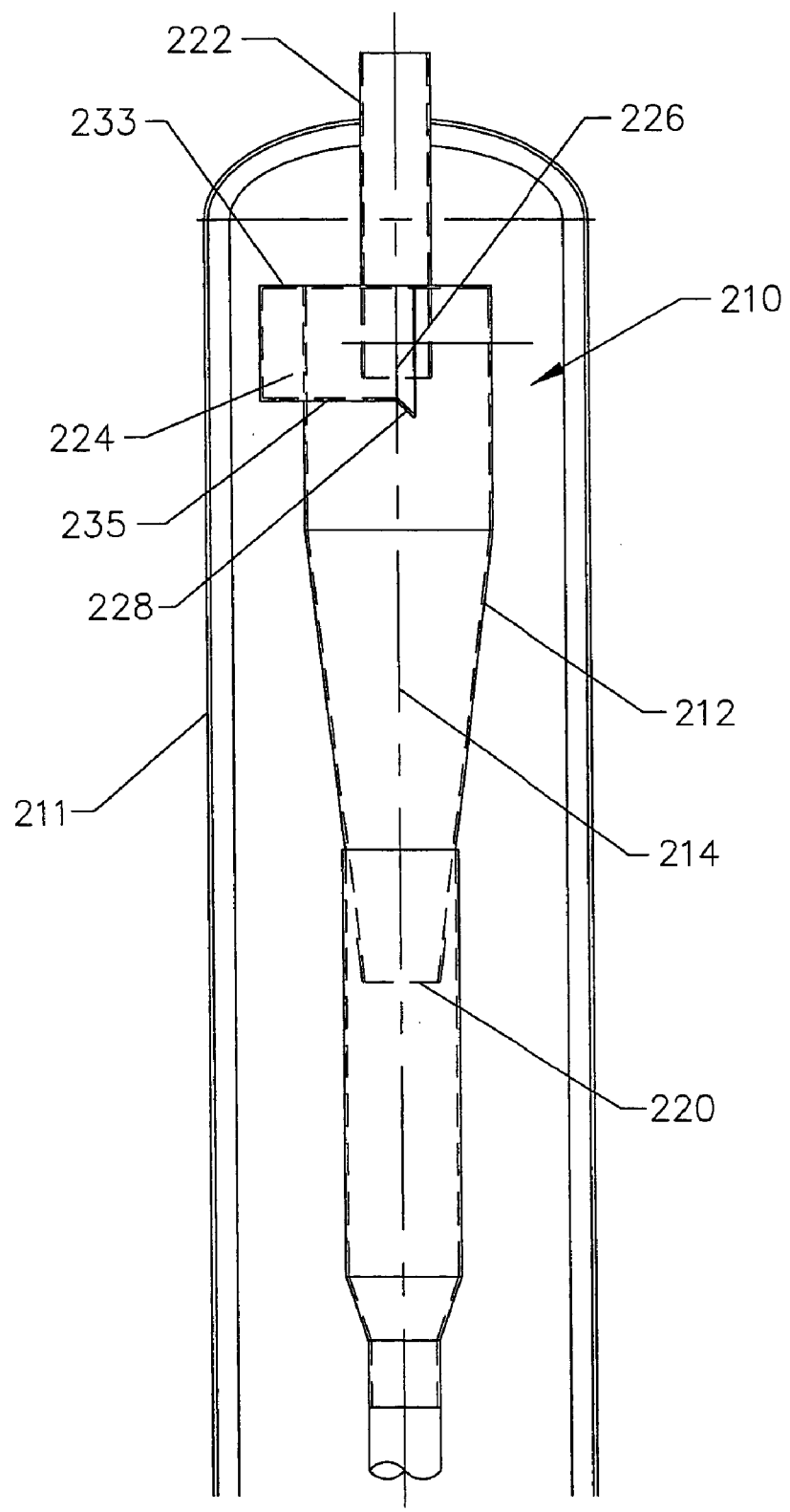
FIG. 6 is a side view of the cyclone of FIG. 5.
Figure 6A:
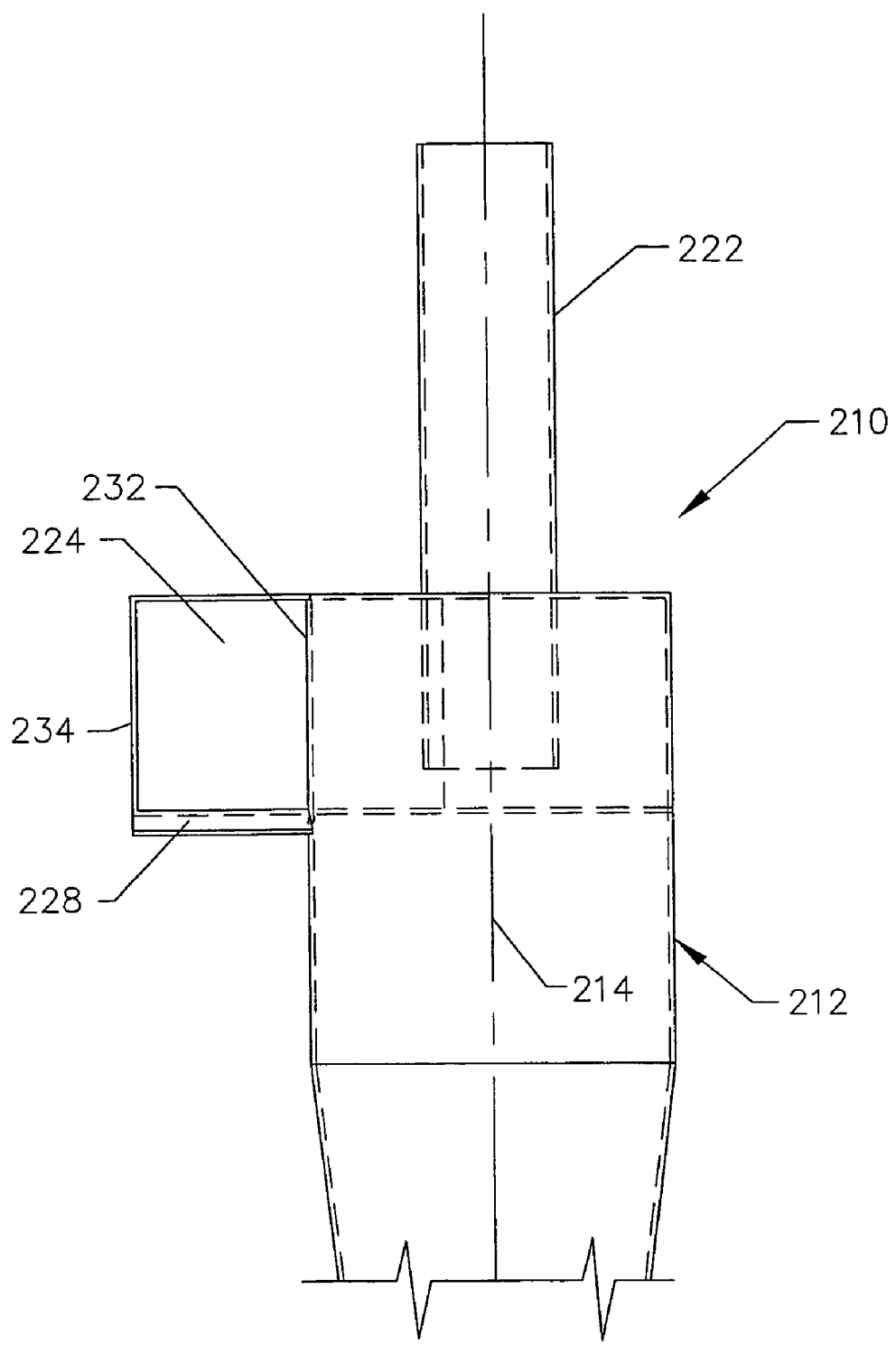
FIG. 6A is an enlarged view taken from the right side of FIG. 6, with the outer vessel removed for clarity.

FIGS. 5, 6, and 6A show a second embodiment of a cyclone 210 made in accordance with the present invention. As with the first embodiment, the cyclone body wall 212 tapers from a larger radius at the top to a smaller radius at the bottom. There is an opening 220 at the bottom and an outlet pipe 222 at the top. The inlet path 224 extends from an outer opening 226 to an inner opening. The inner wall 232 of the inlet path 224 conforms to the cyclone body wall 212, either by being that cyclone body wall 212 itself or by being made of a separate piece of material that follows the contour of the cyclone body wall 212. The outer wall 234 of the inlet path 224 wraps around the cyclone body wall 212 until it becomes tangent to the cyclone body wall 212 at the point 240, where it merges with the cyclone body wall 212, approximately 180° from the inlet 226. The outer wall 234 has a constant radius from a vertical axis 250, which is offset from the central vertical axis 214 of the cyclone body 212. The width of the inlet path 224 from the outer wall 234 to the inner wall 232 gradually decreases from the outer opening 226 to the inner opening 230.

Figure 7:
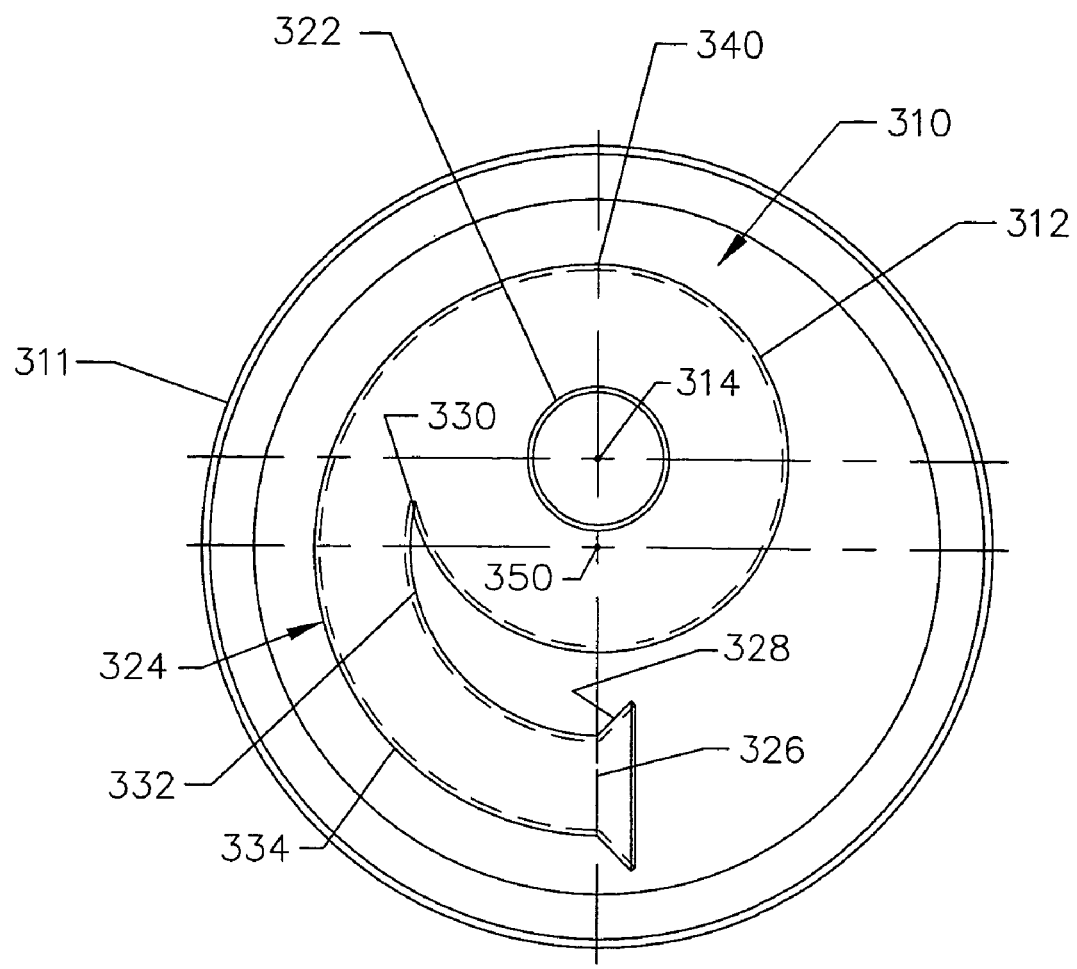
FIG. 7 is a schematic top view of a third cyclone made in accordance with the present invention.
Figure 8:
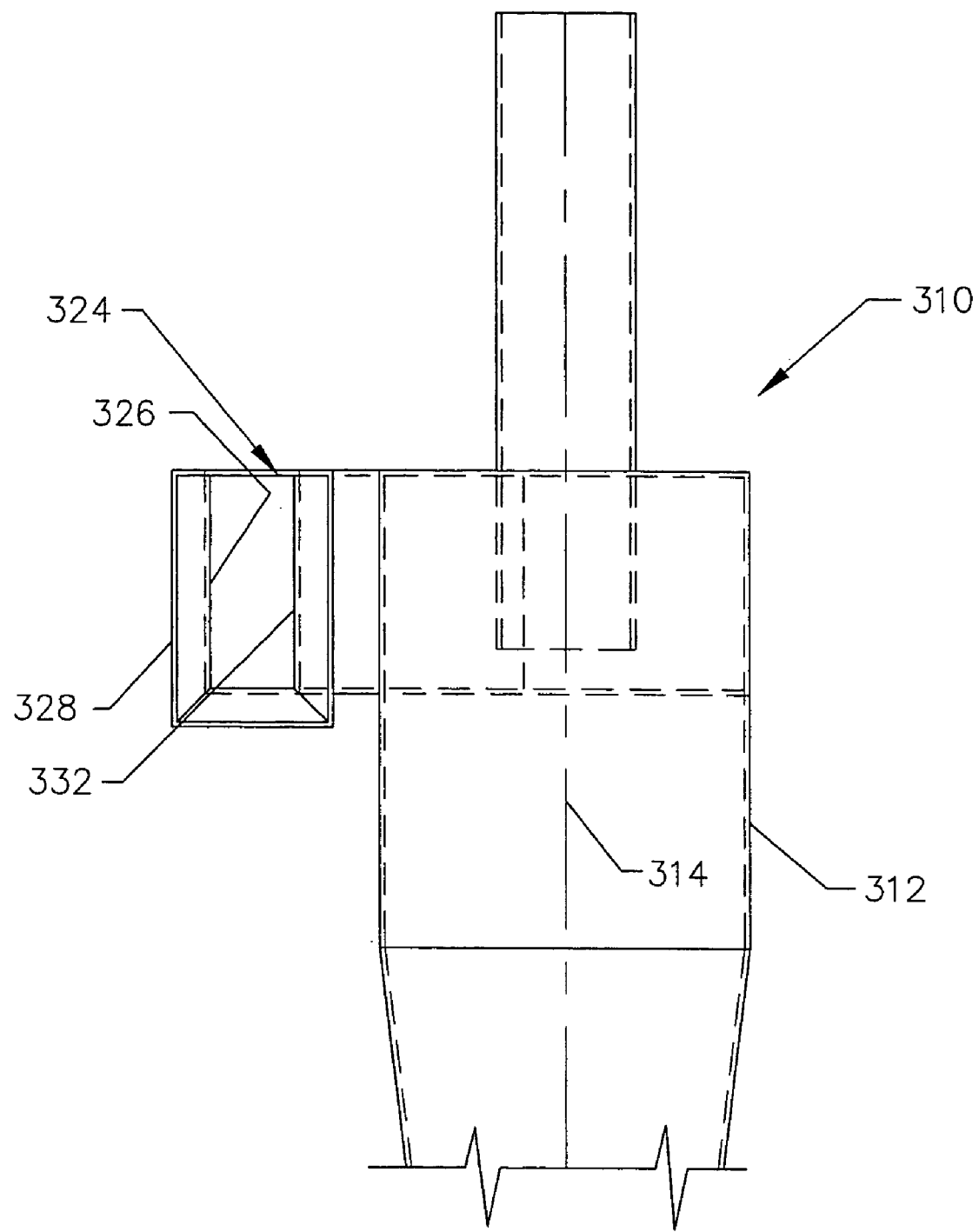
FIG. 8 is a broken-away right side view of the cyclone of FIG. 7, with the outer vessel removed for clarity.

FIGS. 7 and 8 show a third embodiment of a cyclone 310 made in accordance with the present invention. Again, in FIG. 7, this cyclone 310 is shown inside another vessel 311, but it could also be used without the vessel 311. The cyclone body 312 has a circular cross section centered about a vertical axis 314, and the radius of the cyclone body 312 tapers from a larger radius at the top to a smaller radius at the bottom, similar to the other cyclones that have been shown. In this embodiment, the inlet path 324 has an inner wall 332 that has the same radius as the cyclone body 312 at the height of the inlet path 324, but it is centered on a different vertical axis 350, so it merges with the cyclone body 312 at the inner opening 330. The outer wall 334 of the inlet path 324 has a larger radius than the inner wall 332 and is centered on the same vertical axis 350 as the inner wall, wrapping around the cyclone body wall 312 until it becomes tangent with the cyclone body wall 312 at the point 340, approximately 180° from the outer opening 326, where it merges with the cyclone body 312. There is a short flared lip 328 projecting from the outer opening 326 of the inlet path 324, and the width of the inlet path 324 from the outer opening 326 to the inner opening 330 is constant.

The foregoing embodiments are intended to be examples of cyclone separators made in accordance with the present invention, but it will be obvious to those skilled in the art that many modifications may be made to those embodiments without departing from the scope of the present invention.

What is claimed is:

1. A cyclone separator, comprising:

a cyclone body wall having a top and a bottom and defining a central vertical axis, said cyclone body wall forming a chamber having a circular cross-section, with the cyclone body wall having a larger first radius at the top and tapering to a smaller second radius at the bottom;

said cyclone body wall defining an outlet opening at the bottom; and inner, outer, upper, and lower walls defining an inlet path into said cyclone chamber adjacent the top of said cyclone body wall, said inlet path defining an outer opening and an inner opening and extending from said outer opening to said inner opening, wherein said inner wall of said inlet path has a constant radius that is substantially the same as the radius of said cyclone body wall adjacent the top of said cyclone body wall;

wherein said inner wall of said inlet path is a separate wall from said cyclone body wall and is centered on a different vertical axis from the central vertical axis of the cyclone body wall; and wherein the angular distance along said inner side wall from said outer opening to said inner opening is in the range of 600 to 120°.

2. A cyclone separator as recited in claim 1, and further comprising an outwardly-flared lip at said outer opening.

3. A cyclone separator as recited in claim 2, wherein all of said outer, upper, and lower walls flare outwardly at said lip.

4. A cyclone separator as recited in claim 1, wherein said inner wall merges with said cyclone body wall at the inner opening.

5. A cyclone separator as recited in claim 1, wherein the height from said bottom wall to said top wall of said inlet path is constant.

6. A cyclone separator as recited in claim 5, wherein the width from said inner wall to said outer wall is constant.

7. A cyclone separator as recited in claim 5, wherein the width from said inner wall to said outer wall tapers from a larger width at said outer opening to a smaller width at said inner opening.

8. A cyclone separator as recited in claim 1, and further comprising a vessel enclosing said cyclone body wall and said inlet path.

9. A cyclone separator as recited in claim 1, wherein said outer wall of said inlet path becomes tangent to said cyclone body wall at a point and merges with said cyclone body wall at said tangent point.

* * * * *

UNITED STATES PATENT AND TRADEMARK OFFICE
CERTIFICATE OF CORRECTION

PATENT NO. : 6,926,749 B1
DATED : August 9, 2005
INVENTOR(S) : Edwin D. Tenney

It is certified that error appears in the above-identified patent and that said Letters Patent is hereby corrected as shown below:

<u>Column 4,</u>
Line 17, delete "600" and insert therefor -- 60° --.

Signed and Sealed this

Twenty-seventh Day of September, 2005

JON W. DUDAS
*Director of the United States Patent and Trademark Office*